Patented Jan. 2, 1951

2,536,349

UNITED STATES PATENT OFFICE 2,536,349

SELF-POLISHING WAX COMPOSITION

Helen P. Brush, Painesville, Ohio, assignor, by mesne assignments, to E. L. Bruce Company, Memphis, Tenn., a corporation of Delaware No Drawing. Application April 25, 1947, Serial No. 744,028

3 Claims. (Cl. 260—28.5)

This invention relates to surface coating and preserving compositions and more particularly relates to liquid, non-aqueous coating compositions comprising highly chlorinated organic materials and to methods for making the same.

The composition of the present invention comprises generally in addition to the chlorinated organic material, a solvent releasing agent and an organic solvent and is particularly applicable in the field of surface protection of wood surfaces, both previously untreated or raw wood surfaces and preliminarily treated or filled wood surfaces, while having wide application in other fields of surface protection, such as varnished, shellacked, or painted areas, linoleum, or other composition materials. Because of its property of providing high friction on the surface to which it is applied while having high resistance to frictional and other wear, the composition is especially suited to use as a protector for floor surfaces. It is a particular feature of the present composition that upon application to a surface to be treated, the composition dries within a relatively short time without buffing or other polishing action to a high lustre, leaving a glossy, hard, non-slippery surface of substantially water and moisture proof character.

Compositions claiming the properties of the composition of the present invention have heretofore been proposed. Such compositions generally comprise a natural wax dispersed in an aqueous medium or dissolved in a solvent. These materials, when applied to surfaces of wood, paint, or linoleum, and the like, are said to dry within a short time to a non-tacky, glossy film. The thus-treated surfaces do not require further buffing or rubbing to impart a desired degree of gloss thereto and hence, such compositions are known as self-polishing waxes.

The heretofore proposed self-polishing wax compositions of the aqueous type have serious limitations in use, especially when applied to unpainted or unvarnished surfaces of wood, such as hardwood flooring. The principal difficulty involved arises from distortion and swelling of the surface striae of the wood resulting from absorption of the water in the polishing composition. Such distortion of the surface renders the surface grain particularly vulnerable to abrasive frictional contact, such as is had from footwear of persons walking upon or across the surface. In addition, the films thus deposited retain an appreciable amount of the dispersing agent used to disperse the wax in the water. Such dispersing agent in the deposited film acts to decrease water repellency of such film and on contact with water, the wood surface suffers further detrimental swelling and softening.

It has been proposed to apply a natural wax composition or a natural wax combined with various synthetic waxes in a semi-solid or paste form to wood surfaces, such as floors, in order to avoid the presence of water to any substantial degree and thus prevent damage to the grain of the wood surfaces. This method has the disadvantage of requiring much time and extra mechanical treatment by buffing or polishing, to obtain a uniform coating, since the coating must be buffed or rubbed to obtain the desired degree of gloss. In addition, both of the heretofore proposed types of polishes mentioned above possess the disadvantage of requiring expensive natural waxes as the basic ingredient of such compositions. Such natural wax materials, in addition to being expensive, are of generally nonuniform quality in view of their natural origin and thus require modification of formulae for each batch used.

It has also been proposed to dissolve a suitable synthetic wax-like material, such as solid chlorinated paraffin wax, in an organic solvent and to employ such solution as a surface protecting agent, the composition having the advantage of being water-free. It has been found, however, that films of such materials do not dry tack-free within a sufficiently short time to render their use practical in the self-polishing wax field of application.

The present invention has as one of its objects the provision of a self-polishing, surface-preserving composition which is entirely non-aqueous in character and which thus may be applied to unvarnished or unpainted wood surfaces without causing distortion of the surface striae of the grain of the wood.

Another object of the invention is to employ inexpensive, wax-like materials of synthetic origin, easily obtainable in entirely uniform quality.

An important object of the invention is to provide a composition which, when applied to a surface, will dry to self-polished lustre in a very short period of time.

A further object of the invention is to provide a surface coating for smooth finished surfaces, which has a high coefficient of friction.

Still another object is to provide such a coating which, when applied to surfaces of the wood or other flooring material, presents a glossy, non-tacky, durable, high friction, surface film which is not a hazard to life and limb of persons walking upon its surface.

Other objects will appear from the details of the invention as presented hereinafter.

In accordance with the present invention, I have discovered that a highly halogenated organic material, particularly a highly chlorinated, high molecular weight hydrocarbon material and especially a highly chlorinated paraffinic hydrocarbon, such as a chlorinated paraffin having molecules containing from 17 to 35 carbon atoms in the chain, suitably an average of 24 carbons, and containing above 50% of chemically combined chlorine and particularly from 65% to 75% chlorine, when combined with a suitable compatible solvent releasing agent and contained in a solvent for both the chlorinated material and the solvent releasing agent, which solvent preferably comprises a hydrocarbon liquid having a high flash point and which is substantially non-toxic to warm-blooded animals, provides a non-toxic, fast-drying, surface coating composition which, when spread on a surface, dries to a glossy, hard, durable, high friction water repellent surface in a very short time of the order of 20 minutes or less.

As solvent releasing agents, I prefer to employ minor amounts of synthetic, resinous bodies characterized in part by having in the monomer state the empirical formula $H_2C=CRR'$, wherein R is either methyl or hydrogen, R' is butyl carboxy or isobutyl carboxy ($-COOC_4H_9$), when R is methyl and phenyl or substituted phenyl when R is hydrogen. These materials are preferably employed in a partially polymerized or thermoplastic state, it being desirable to incorporate such materials in the compositions of this invention at the stage of polymerization, where sufficient effect is had upon solvent release as evidenced by comparison of the drying times of comparative compositions with and without the addition of the resinous material. Thus, it has been found that when employing a high-flash hydrocarbon solvent, polymeric materials of the class above described which are only sufficiently polymerized so that they are still in a thermoplastic state are, in general, preferred. More particularly and further to characterize certain of the resinous polymeric materials preferred by me, styrene resins having softening points (ball and ring method, A. S. T. M. specification E28-42T) much below 100° C., have insufficient effect upon the drying of the polish on a wood surface, and those materials having a softening point appreciably above 150° C. are too insoluble in the solvent to have an optimum effect in the composition. In general and pursuant to the objects of this invention, I prefer to employ a resinous solvent releasing agent soluble to the extent of at least 10% in the herein described solvents, such as a high-flash hydrocarbon liquid.

The described thermoplastic polymerized materials incorporated herein are designated as solvent releasing agents as this is the best present explanation of their action now available. This designation is not to be understood as limiting the scope of the invention, however, as the actual function of these materials is not presently completely understood.

For example, I may employ as the resinous polymeric body a resinous polymerization product of substantially pure styrene or copolymerization products of styrene and styrene homologues. Such resinous products are preferably polymerized to such an extent that the softening points fall within the temperature range of about 100° C. to 150° C. when tested according to the above noted standard. Such materials may, if desired, be modified with plasticizers such as alkyl esters of aromatic acids or the like in order to alter their solubility in the particular type of solvent employed, or to depress the softening temperature thereof in order that it fall within the desired range, or to improve their compatibility with the chlorinated hydrocarbon materials. However, of the substances derived from styrene or styrene homologues, I prefer to use polymerized substantially pure styrene material.

In place of the polymerized styrene material or polymerized styrene homologues, I may use polymerized thermoplastic acrylic acid esters, such as a polymerized normal butyl methacrylate or isobutyl methacrylate.

As noted above, the solvents preferably used in the compositions of this invention comprise liquid hydrocarbon materials or the like, preferably those of the type known as "high-flash" and including especially hydrocarbon solvents having a flash point in the range of about 25° to 45° C. (about 80° to 110° F. as determined by the closed cup method, see A. S. T. M. specification D56–36). Of such hydrocarbon solvents, I prefer to use substantially saturated aliphatic materials, such as high-flash napthas and the like, having flash points substantially within the designated range. These materials are preferred because of the substantial absence of toxicity of their vapors and are especially desirable in applications of the invention where absence of toxicity is essential, such as domestic use or in industrial establishments where hand application is employed.

In some applications of the present invention, however, particularly those where the evaporating solvent vapors do not come in contact with working personnel or occupants of the areas treated, solvent materials ordinarily more toxic in vapor form may suitably be employed. These materials include aromatic solvents of substantially the same flash point as hereinbefore described and halogenated solvents, such as carbon tetrachloride, trichlorethylene, perchlorethylene, chloroform, and the like.

It will be appreciated that while with respect to the chlorinated solvents, no fire hazard exists, the hydrocarbon solvents, if of a too volatile character, present definite danger of fire and explosion and hence, my preference for the flash point range as given above. In addition, solvents within the stated range, while evaporating with sufficient speed to produce the desired fast-drying property, are also preferred since solvents much lower in flash point, in addition to presenting a fire hazard, tend in their extremely rapid evaporation to cool the surface treated well below the dewpoint of the moisture in the ambient atmosphere, thus permitting the deposit of liquid water in minute droplets upon the drying wax surface whereby the glossy surface desired cannot be achieved.

The chlorinated material and the resinous plastic material may be dissolved in an amount of one of the above type solvents to an extent that combined solids in the solution are equal to between about 15% and 35% of the total composition. In general, however, and for optimum results I have found it preferable to employ total solids of between 20% and 27%, ideally about 22% to 25%. The ratio of the weight of chlorinated material to polymeric bodies is preferably within the range of 3:1 to 5:1. The two ingredients may be dissolved in the same body of solvent simultaneously with no detriment to the composite film subsequently deposited therefrom or they may be dissolved in separate portions of solvent and the solutions subsequently combined without altering the properties of the film deposited therefrom. Also, I may filter either or both solutions separately or the solution of the two ingredients together prior to applying the same to a surface in order to remove therefrom any foreign matter or insoluble portions of either solid component of the solutions and to improve the lustre and gloss of the supported film.

The solution of the mixture of solid chlorinated paraffin wax and resinous polymeric bodies may be applied to wood surfaces or other solid surfaces by spraying, wiping, brushing, or other convenient means to deposit thereon a relatively thin, preferably even coating. Such coating will dry or set-up to a tack-free condition within a relatively short time of the order of a fraction of an hour and in preferred cases, less than 20 minutes. The surface obtained has high gloss, a high coefficient of friction, and durability greater than known aqueous wax dispersions.

In order more particularly to point out means by which the present invention may be practiced, the following specific examples are offered:

Example I 6 parts by weight of a solid chlorinated paraffin wax containing approximately 70% of chemically combined chlorine are dissolved 24 parts by weight of a naptha substantially entirely of an aliphatic character having a flash point of about 100° F., and after solution of the chlorinated paraffin wax is effected, the material is filtered. Subsequent to the filtration, 2 parts by weight of thermoplastic polymerized isobutyl methacrylate are dissolved in the solution of the chlorinated paraffin wax. Mild heating with agitation aids in effecting complete solution of the polymer within a short time. The solution thus formed is applied to an unvarnished and unpainted, smooth-finished, filled, wood surface by brushing and is found to dry tack-free within a period of about 20 minutes. The polished surface thus obtained has a very good gloss and possesses a high coefficient of friction relative to ordinary wax materials; the high coefficient of friction makes it difficult to cause slipping of cloth or leather materials in contact with the surface.

Example II 19 parts by weight of a chlorinated paraffin wax containing about 70% of chemically combined chlorine are dissolved in 77.1 parts by weight of a hydrocarbon solvent substantially entirely of an aliphatic character and having a flash point of about 100° F. The solution thus formed is filtered and subsequently 3.9 parts by weight of thermoplastic, polymerized, normal butyl methacrylate are dissolved therein. The solution thus formed is applied to an unvarnished and unpainted, smooth-finished, hardwood surface by brushing. Within a period of about 20 minutes, the film deposited upon the wood surface has dried to a tack-free, glossy condition, presenting a surface having the same friction characteristics as that in Example I.

Example III 19 parts by weight of a chlorinated paraffin wax containing about 70% of chemically combined chlorine are dissolved in 77 parts of a high-flash naptha having a flash point of about 100° F. and having substantially complete aliphatic character. After dissolving the chlorinated paraffin, the solution is filtered and 4 parts by weight of a polymer obtained by the polymerization of substantially pure styrene, the polymer having a softening point within the range of 100° to 150° C., are dissolved in the chlorinated paraffin wax solution. Heating aids in effecting complete solution of the polymerized styrene material in the solution of the chlorinated paraffin wax. The resulting solution applied to a smooth-finished surface presents a smooth, glossy surface which dries to a tack-free condition within a period of about 20 minutes. The surface possesses substantially the same non-skid properties as observed in Example I.

In some instances the use of conventional paint drying agents of the type well-known in the art, such as the heavy metal resinates of fatty acids, examples of which are lead naphthenate or cobalt linoleate or combinations of the two, may enhance the drying properties of the composition. The following example is an illustration of this application.

Example IV 19 parts by weight of a solid chlorinated paraffin wax containing approximately 70% of chemically combined chlorine are dissolved in a high-flash naptha having a flash point of about 100° F. The resulting solution is filtered. 4 parts by weight of a synthetic resin obtained by co-polymerizing styrene and styrene homologues, the polymerization product having been modified with an alkyl ester of an aromatic acid in such a manner that its softening point is about 125° C., is dissolved in the same solvent as that used for the solution of the chlorinated paraffin wax. A drying agent is prepared by combining 10 parts by weight of lead naphthenate with 1 part by weight of cobalt linoleate and 4 parts of weight of this mixture dissolved in the same type solvent as that used for this chlorinated paraffin wax. The total amount of the combined solvent used to dissolve all 3 ingredients is equal to 77 parts. The three solutions are combined and the resulting solution, when applied to smooth-finished, unvarnished and unpainted, wood surfaces by brushing presents a non-tacky, glossy film within a period of about 20 minutes. Marks made by the footwear of persons walking upon such surface film after the drying period are easily wiped off with a dry cloth. The surface possesses substantially the same non-skid properties as observed in Example I.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in

What is claimed is:

1. A self-polishing floor wax composition comprising a volatile substantially saturated aliphatic high flash hydrocarbon naphtha solvent having a flash point within the range of 80 to 110° F., having dissolved therein between about 15 and 35% of solids consisting essentially of chlorinated paraffin wax, comprising paraffin wax having between 17 and 35 carbon atoms containing from 50 to 75% of chemically combined chlorine and a resin having a softening point in the range of about 100 to 150° C. selected from the group consisting of a polystyrene, a polybutyl methacrylate and a polyisobutyl methacrylate, the ratio of said chlorinated wax to said resin being in the approximate range of from 5:1 to 3:1.

2. The composition as defined in claim 1 wherein the resin is polystyrene obtained by polymerization of substantially pure styrene.

3. The composition as defined in claim 1 wherein the resin is a methacrylate obtained by polymerization of isobutyl methacrylate.

HELEN P. BRUSH.

REFERENCES CITED

The following references are of record in the file of this patent:

Diamond, "Diamond Chlorowax," Diamond Alkali Company, 1945, Pittsburgh, Pa.

Diamond, "Diamond Chlorowax," Diamond Alkali Company, (advertised in Paint, Oil, and Chemical Review, Aug. 22, 1946, page 19).